(12) United States Patent
Casagrande (10) Patent No.: US 6,403,191 B1
(45) Date of Patent: Jun. 11, 2002

(54) LAMINATE WITH INTEGRATED COMPACT DISK LABEL AND METHODS

(75) Inventor: Charles L. Casagrande, Kingshill West Malling (GB)

(73) Assignee: Strata-Tac, Inc., Batavia, IL (US)

( * ) Notice: Subject to any disclaimer, the term of this patent is extended or adjusted under 35 U.S.C. 154(b) by 0 days.

(21) Appl. No.: 09/400,323

(22) Filed: Sep. 21, 1999

(51) Int. Cl.[7] .............................. B23B 7/06; B23B 7/10; B42D 15/00
(52) U.S. Cl. ..................... 428/42.2; 428/41.7; 428/42.1; 428/40.1; 428/43; 428/343; 428/66.5; 428/66.6; 428/354; 283/81
(58) Field of Search ..................... 428/40.1, 43, 41.8, 428/41.9, 42.1, 343, 354, 42.2, 66.6, 66.7, 66.5, 64.1; 283/81; 40/638

(56) References Cited

U.S. PATENT DOCUMENTS

| 4,983,437 A | 1/1991 | Merrick | 428/40 |
| 5,316,464 A | 5/1994 | Lexell | 425/318 |
| 5,518,325 A | 5/1996 | Kahle | 400/70 |
| 5,543,001 A | 8/1996 | Casillo et al. | 156/60 |
| 5,657,869 A | 8/1997 | Carroll, III | 206/451 |
| 5,736,212 A | * 4/1998 | Fischer | 428/42.2 |
| 5,770,289 A | 6/1998 | Tracy | 428/40.1 |
| 5,781,221 A | 7/1998 | Wen et al. | 347/232 |
| 5,799,982 A | 9/1998 | McClure et al. | 283/81 |
| 5,824,388 A | 10/1998 | Freund et al. | 428/131 |
| 5,902,446 A | 5/1999 | Casillo et al. | 156/379.8 |
| 6,168,841 B1 | * 1/2001 | Chen | 428/40.1 |

* cited by examiner

*Primary Examiner*—Harold Pyon
*Assistant Examiner*—Elena Tsoy
(74) *Attorney, Agent, or Firm*—Thompson Coburn LLP; Grant D. Kang; Robert C. Haldiman (57) ABSTRACT

A printable business laminate having an integrated compact disk label including methods of manufacture and use. The laminate has an integrated and printable compact disk label including a carrier lamina, a first adhesive lamina, a printable lamina adhesively secured to the carrier lamina by the first adhesive lamina, a first die cut through said carrier lamina substantially corresponding to the perimeter of a compact disk a second die cut through the printable lamina which may correspond to the hub or hole in a compact disk, and perforations through the printable lamina substantially corresponding to the perimeter of the compact disk.

39 Claims, 6 Drawing Sheets

```
┌─────────────────────────────────────────────────┐
│ CREATING A LAMINATE WITH INTEGRATED CD LABEL.   │
└─────────────────────────────────────────────────┘
                         │
                         ▼
┌─────────────────────────────────────────────────┐
│ PRINTING INDICIA ON AT LEAST ONE SURFACE OF A   │
│ PRINTABLE LAMINA OF A LAMINATE WITH INTEGRATED  │
│ COMPACT DISK LABEL.                             │
└─────────────────────────────────────────────────┘
                         │
                         ▼
┌─────────────────────────────────────────────────┐
│ REMOVING A WASTE SLUG PORTION OF SAID LAMINATE  │
│ THEREBY CREATING A WELL IN SAIL LAMINATE AND    │
│ EXPOSING A PORTION OF A FIRST ADHESIVE LAMINA   │
│ AT THE BOTTOM OF SAID WELL.                     │
└─────────────────────────────────────────────────┘
                         │
                         ▼
┌─────────────────────────────────────────────────┐
│ PLACING A CD IN SAID WELL SUCH THAT THE SURFACE │
│ OF THE DISK TO BE LABELED IS IN CONTACT WITH    │
│ SAID FIRST ADHESIVE LAMINA THEREBY SECURING     │
│ THE CD TO SAID PRINTABLE LAMINA.                │
└─────────────────────────────────────────────────┘
                         │
                         ▼
┌─────────────────────────────────────────────────┐
│ REMOVING THE CD, WITH THE PORTION OF PRINTABLE  │
│ LAMINA ADHESIVELY SECURED THERETO, FROM THE     │
│ LAMINA BY BREAKING PERFORATIONS IN SAID         │
│ PRINTABLE LAMINA.                               │
└─────────────────────────────────────────────────┘
```

FIG. 9

```
┌─────────────────────────────────────────────────┐
│ CREATING THE LAMINATE BY SECURING A PRINTABLE   │
│ LAMINA TO A CARRIER LAMINA BY A FIRST           │
│ ADHESIVE LAMINA.                                │
└─────────────────────────────────────────────────┘
                         │
                         ▼
┌─────────────────────────────────────────────────┐
│ CREATING A FIRST DIE CUT THROUGH SAID CARRIER   │
│ LAMINA AND AT LEAST TO SAID FIRST ADHESIVE      │
│ LAMINA BUT NOT THROUGH SAID PRINTABLE LAMINA.   │
└─────────────────────────────────────────────────┘
                         │
                         ▼
┌─────────────────────────────────────────────────┐
│ CREATING A SECOND DIE CUT THROUGH SAID          │
│ PRINTABLE LAMINA AND AT LEAST TO SAID FIRST     │
│ ADHESIVE LAMINA BUT NOT THROUGH SAID CARRIER    │
│ LAMINA.                                         │
└─────────────────────────────────────────────────┘
                         │
                         ▼
┌─────────────────────────────────────────────────┐
│ CREATING PERFORATIONS IN SAID PRINTABLE LAMINA. │
└─────────────────────────────────────────────────┘
```

FIG. 10

LAMINATE WITH INTEGRATED COMPACT DISK LABEL AND METHODS

CROSS-REFERENCES TO RELATED APPLICATIONS

Not Applicable.

STATEMENT OF FEDERALLY SPONSORED RESEARCH OR DEVELOPMENT

Not Applicable.

REFERENCE TO MICROFICHE APPENDIX

Not Applicable.

BACKGROUND OF THE INVENTION

1. Technical Field

This invention relates to the field of laminate forms with integrated labels. Specifically, the inventive apparatus is a printable business form with an integrated and printable compact disk label comprising a carrier lamina, a first adhesive lamina, a printable lamina adhesively secured to the carrier lamina by the first adhesive lamina, a first die cut through said carrier lamina substantially corresponding to the perimeter of a compact disk ("CD"), a second die cut through the printable lamina corresponding to the hub or hole in a CD, and perforations through the printable lamina substantially corresponding to the perimeter of the CD.

One inventive method relates to the use of the laminate. In use, a waste slug, comprising the portion of the carrier lamina within the first die cut along with the portion of the printable lamina within the second die cut and the portion of the first adhesive lamina between them, is removed from the laminate. This creates a well exposing a portion of the first adhesive lamina at the bottom of the well. The CD may be placed into that well. By placing the CD into the well and adhesively securing it to the printable lamina, the CD is labeled by the portion of the printable lamina within the perforations. The laminate with CD combination may then be used as a mailer or other advertisement, as desired. Ultimately, the labeled CD may be removed from the laminate by breaking the perforations, leaving the portion of the printable lamina within the perforations attached to the CD as the CD label. Of course, at nearly any point in the above process, printed indicia may be placed on the carrier lamina and/or the printable lamina as desired.

Also included in the invention is a method of manufacturing the laminate including the steps of laminating a printable lamina to a carrier lamina using a first adhesive lamina, creating a first die cut through the carrier lamina and at least to the first adhesive lamina but not through the printable lamina, creating a second die cut through the printable lamina and at least to the first adhesive lamina but not through the carrier lamina, and creating perforations in the printable lamina.

2. Background of the Related Art

With the advent of readily recordable CDs has come the need for labels customizable by end users. Also, the cost of the CD has decreased such that it has become a viable medium for transfer of promotional material. As such, the opportunity exists for promotional materials to be customized with data relevant to individual target users. Such customization could include changes to the CD label, the form accompanying the label, and even to the data on the CD itself.

Known methods and apparatus for labeling of CDs fall into a few narrow categories. The most widely known methods are used by mass producers of CDs who print indicia directly on to the surface of the disk, for example, as discussed in U.S. Pat. No. 5,781,221 to Wen. Clearly this is not a viable alternative for those who only occasionally create labeled disks as the expense and complexity of the operation and necessary equipment are prohibitive. A variation on this method, apparently directed towards occasional users, involves the use of a carrier for running a CD through an ink-jet type computer printer for direct printing thereon, as shown in U.S. Pat. No. 5,824,388 to Fruend. Such carriers are inconvenient and unwieldy for labeling a large quantity of disks. Also, the labeling produced by such a device and method may be subject to the limitations of an ink-jet system which is not normally compatible with the smooth plastics CDs are composed of and may produce a runny or smeared label which is not durable or permanent.

Next, various label manufacturers have produced adhesive labels to be removed from a sheet and placed on the surface of the CD to label the CD. An example of such labels is disclosed in U.S. Pat. No. 5,770,289 to Tracy. The primary problem exhibited by such labels is the need for a separate label aligner system to properly place the label on the CD. Aside from aesthetic reasons, proper alignment of the label to the disk is crucial because a misaligned label can alter the spin of the disk and thus its ability to be accessed reliably by a CD reader or writer.

U.S. Pat. No. 5,902,446 to Casillo exemplifies these types of label aligner systems. Obvious disadvantages to such systems are their added complexity, cost and bulk. Also, the use of the stick-on labels and separate label aligners do not normally provide for convenient and efficient synchronization of customization to the data on the CD and the label as would be required for promotional materials targeted to specific recipients. And finally, peel-off labels with mechanical alignment devices present numerous opportunities for user error and user induced inaccuracies.

Of course, users have also attempted to hand write labels on the surface of the CDs. This has the obvious disadvantages of being messy, subject to inaccuracies and not suitable for use on many CDs. Clearly, the quality of hand drawn labels are also limited to the skill of the user applying the label.

A goal of the present invention is to provide for a form with integrated CD label which is self-aligning to the CD and requires no other apparatus for application to the CD.

Another goal is to provide for a CD label which can label CDs of various sizes and shapes, including CD cards.

Another goal is to provide for a CD label which is easily and quickly printable in virtually any type of printer.

Another goal is to provide for a CD label which is inexpensive and easy to use.

Another goal is to provide for a CD label integrated into a business form which is itself printable and customizable.

Another goal is to provide for a CD label integrated into a mailer such as that used to mail promotional material.

Another goal is to provide for a customizable CD label integrated into a customizable business form which provides for efficient synchronization of the customizations to the CD, form and label.

Another goal is to provide for a customizable CD label laminate which is cost effective and efficient to use by individual users, small businesses, corporations, and even large marketing firms.

Other goals will be pointed out in or apparent from the following description.

BRIEF DISCLOSURE OF THE INVENTION

This inventive apparatus is a printable business form with an integrated and printable CD label comprising a carrier lamina, a first adhesive lamina, a printable lamina adhesively secured to the carrier lamina by the first adhesive lamina, a first die cut through said carrier lamina substantially corresponding to the perimeter of a CD, a second die cut through the printable lamina which may correspond to the hub or hole in a CD, and perforations through the printable lamina substantially corresponding to the perimeter of the CD.

One inventive method relates to the use of the laminate. In use, a waste slug, comprising the portion of the carrier lamina within the first die cut along with the portion of the printable lamina within the second die cut and the portion of the first adhesive lamina between them, is removed from the laminate. This creates a well exposing a portion of the first adhesive lamina at the bottom of the well. The CD may be placed into that well. By placing the CD into the well and adhesively securing it to the printable lamina, the CD is labeled by the portion of the printable lamina within the perforations. The laminate with CD combination may then be used as a mailer or other advertisement, as desired. Ultimately, the labeled CD may be removed from the laminate by breaking the perforations, leaving the portion of the printable lamina within the perforations attached to the CD as the CD label. Of course, at nearly any point in the above process, printed indicia may be placed on the carrier lamina and/or the printable lamina as desired.

Also included in the invention is a method of manufacturing the laminate including the steps of laminating a printable lamina to a carrier lamina using a first adhesive lamina, creating a first die cut through the carrier lamina and at least to the first adhesive lamina but not through the printable lamina, creating a second die cut through the printable lamina and at least to the first adhesive lamina but not through the carrier lamina, and creating perforations in the printable lamina.

Similar reference numbers refer to similar aspects of the invention throughout the various figures. Exploded aspects of the inventive laminate shown on the right hand sides of FIGS. 4 through 7 are to more accurately show reference elements and not to show structure.

DETAILED DESCRIPTION OF THE INTENTION AND MODE(S) FOR CARRYING OUT THE INVENTION

FIGS. 1 through 5 show the primary embodiment of the present invention which includes a carrier lamina 22, a first adhesive lamina 24, a printable lamina 26, first and second looped die cuts 28, 30 and a loop of perforations 32. The bottom surface 22b of the carrier lamina 22 is secured to the top surface 26a of the printable lamina 26 by the first adhesive lamina 24, creating the laminate 20. The first looped die cut 28 corresponds to the perimeter 34a of a CD 34 and extends through the carrier lamina 22 and at least to the first adhesive lamina 24, but not through the printable lamina 26. The second looped die cut 30 usually corresponds to the hole 34b or hub 34c in a CD 34 and extends through the printable lamina 26 and at least to the first adhesive lamina 24 but not through the carrier lamina 22. The perforations 32 in the printable lamina 26 substantially correspond to the outside edge 34a of the CD 34.

Figure 5:
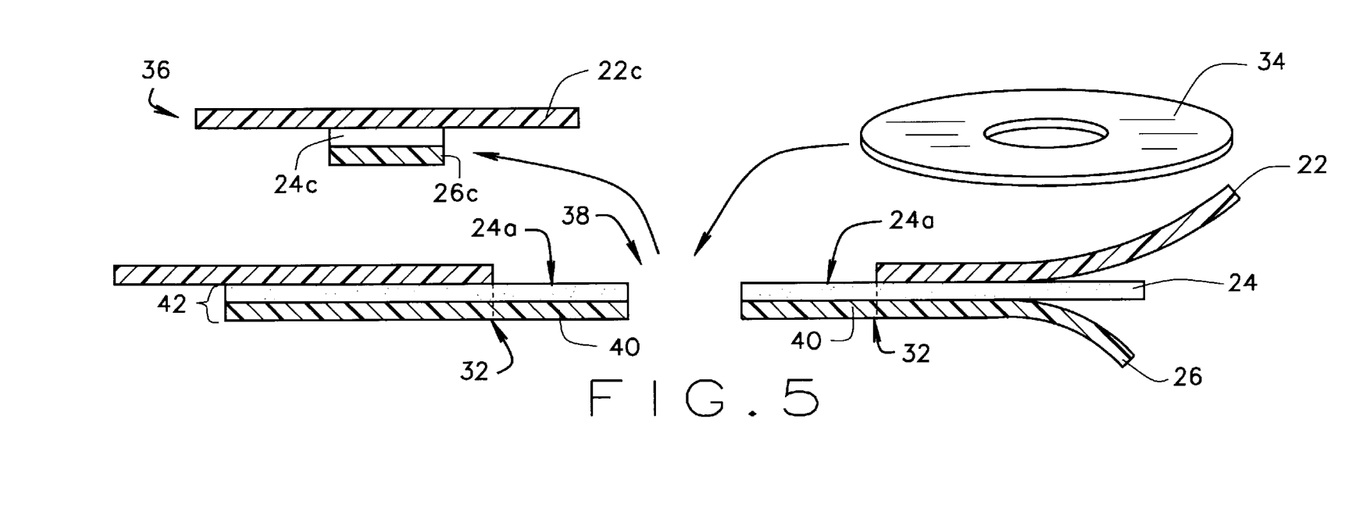
FIG. 5 is a cross section of the inventive laminate shown in FIG. 3 along the line 5, illustrating the waste slug removal and CD insertion.

Together, the first 28 and second 30 looped die cuts define a waste slug 36, shown in FIG. 5, which is the waste portion 22c of the carrier lamina 22 within the first die cut 28 and the waste portions of the first adhesive lamina and printable lamina, 24c and 26c, within the second die cut 30. The first adhesive lamina 24 has a greater affinity for the printable lamina 26 than the other lamina secured to the first adhesive lamina 24. This ensures that the first adhesive lamina 24 will remain on the printable lamina 26 as the other lamina are separated from the first adhesive lamina 24. Thus, the waste slug 36 is removable from the remainder of the laminate 20 and its removal creates a well 38 in the laminate 20 within which a CD 34 may be placed, said well 38 having an exposed portion 24a of the first adhesive lamina 24 at the bottom thereof. When placed in the well 38, the CD 34 is adhesively secured to the printable lamina 26, which labels the CD with the label 40, said label 40 comprising the portion of the printable lamina 24 within the perforations 32. More importantly, the CD 34, with its attached label 40, can be removed from the remainder of the laminate 20 by breaking the perforations 32 in the printable lamina 26.

All the lamina described herein may be in any form and shape, including but not limited to, continuous web, sheet, perforated or pleated web or any other suitable configuration. Also, each lamina may itself be a multi-ply lamination, if desired. For example, both the carrier lamina 22 and printable lamina 26 may comprise a base stock with printable topcoatings thereon instead of a single lamina of printable stock.

Similarly, the perforations described herein are frangible connections of any suitable type and configuration, including, but not limited to, cuts and ties, slit-over perforations, and other arrangements. But while their shape and structure may vary as appropriate, the first die cut 28, second die cut 30 and perforations 32 are all closed loops and concentric.

Figure 1:
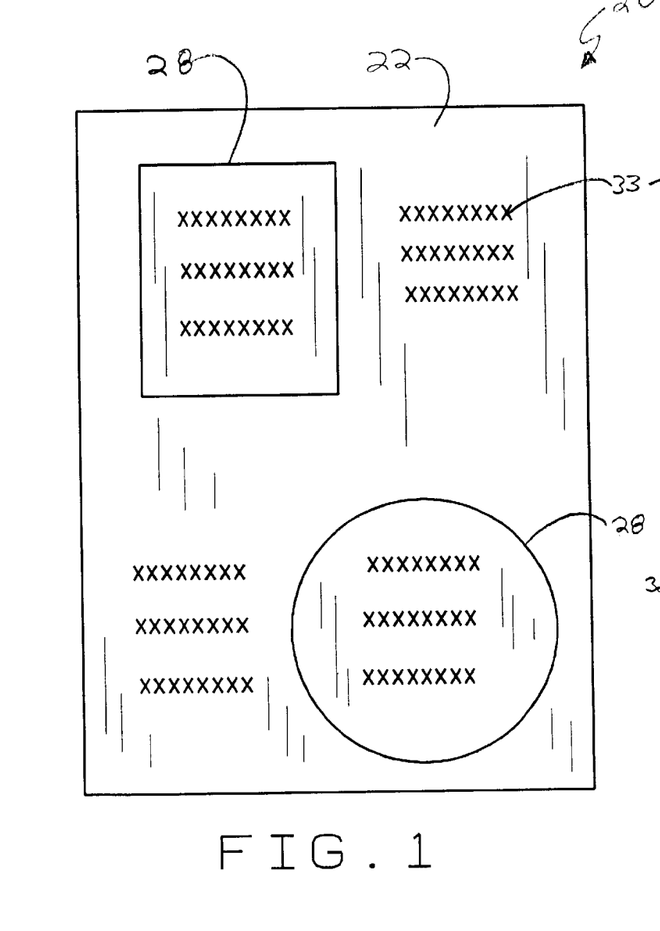
FIG. 1 is a top view of the inventive laminate showing two of the various shapes of the first die cut.
Figure 2:
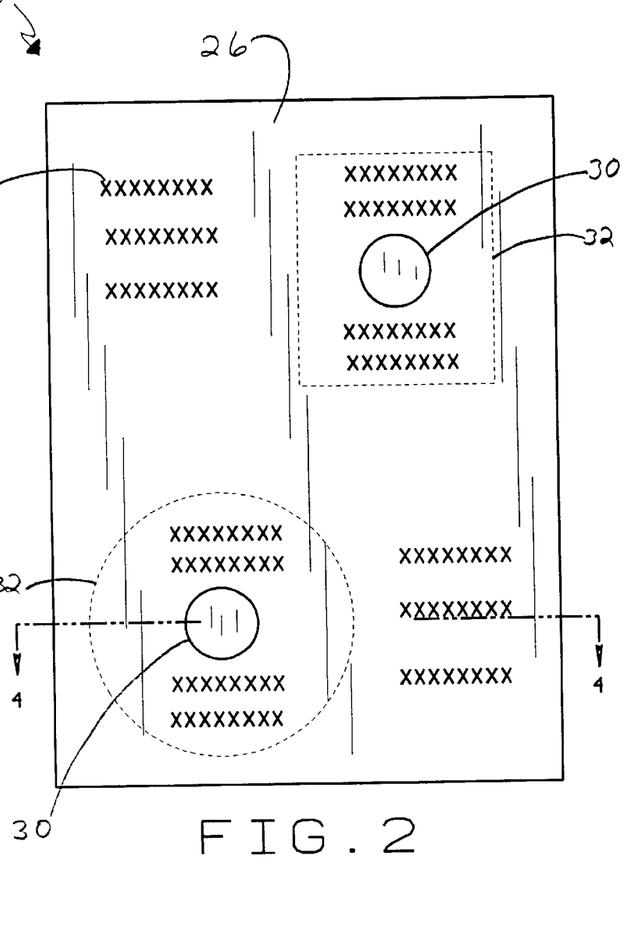
FIG. 2 is a bottom view of the inventive laminate in full size form showing the second die cut and the perforations.

The terms CD and compact disk, as used herein, refer not only to the well-known optically encoded storage medium of a circular shape popularized by computer CD-ROMs and music disks, but also to those of other geometric shapes, including polygons, as shown in FIGS. 1 and 2. Thus, references herein to "a radius" of the various elements, as they relate to an element having a shape other than circular, shall refer to the various distances between the center of the element and appropriate points along the perimeter of the element. Thus, corresponding radii shall use corresponding points of the elements in question. For example, references herein to CD shall include, but are not limited to, the recently released storage medium known as CD "cards" which are square or rectangular in shape.

Also, as is apparent from the description herein, the present invention may accommodate CDs of various sizes simply by adjusting the length of the radii of the first and second die cuts 28, 30 and the loop of perforations 32.

Print and printing as used herein, shall include all suitable forms of placing indicia 33 onto a surface, including, but not limited to, handwriting, ink jet, computer, laser printing, flexographic printing, photocopying, and offset printing.

Figure 3:
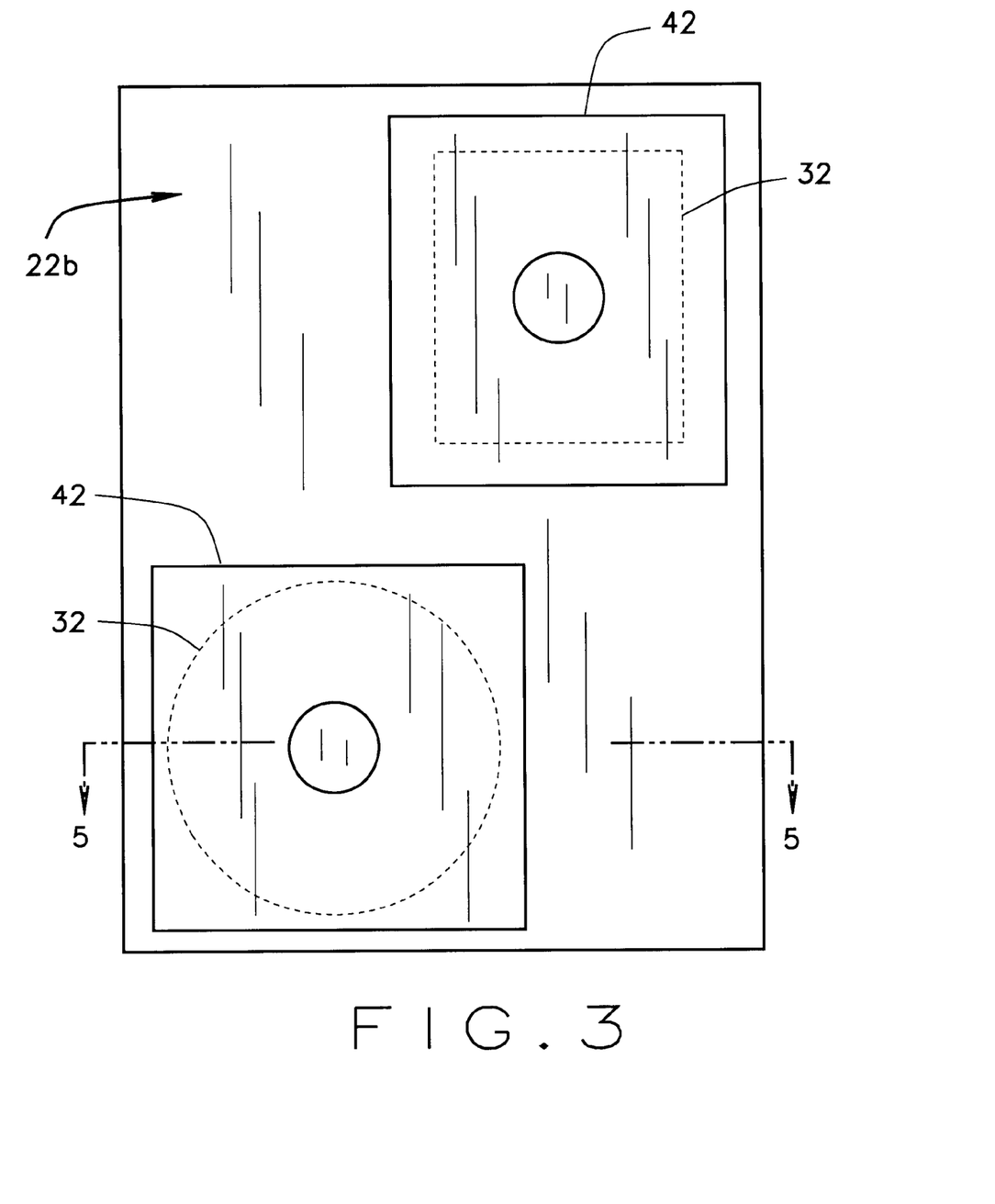
FIG. 3 is a bottom view of the inventive laminate in patch form showing the perimeter of the patch, the second die cut and the perforations.
Figure 4:
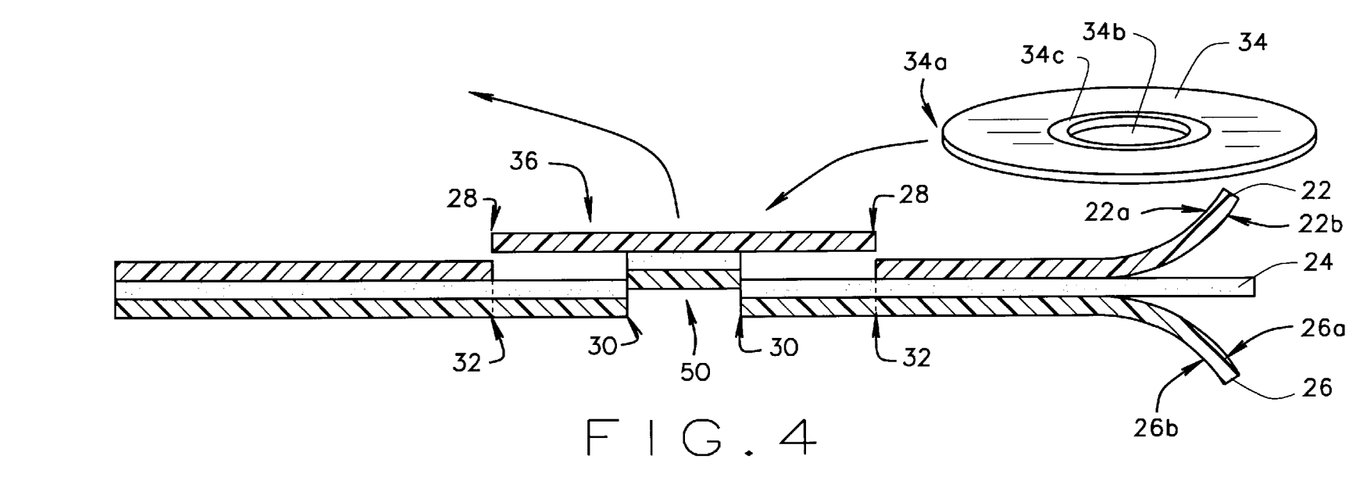
FIG. 4 is a cross section of the inventive laminate shown in FIG. 2 illustrating the waste slug removal and CD insertion.

Turning back to the structure of the inventive laminate 20, we see that FIGS. 2 and 4, in light of FIGS. 3 and 5, show two basic forms of the inventive lamination 20. As shown, the difference in these forms is the relative size of the carrier lamina 22 in relation to the rest of the laminate 20. FIGS. 2 and 4 show the invention in a full size laminate form wherein most, if not all, layers of the laminate have substantially the same size and shape resulting in their perimeters substantially corresponding with each other.

Figure 7:
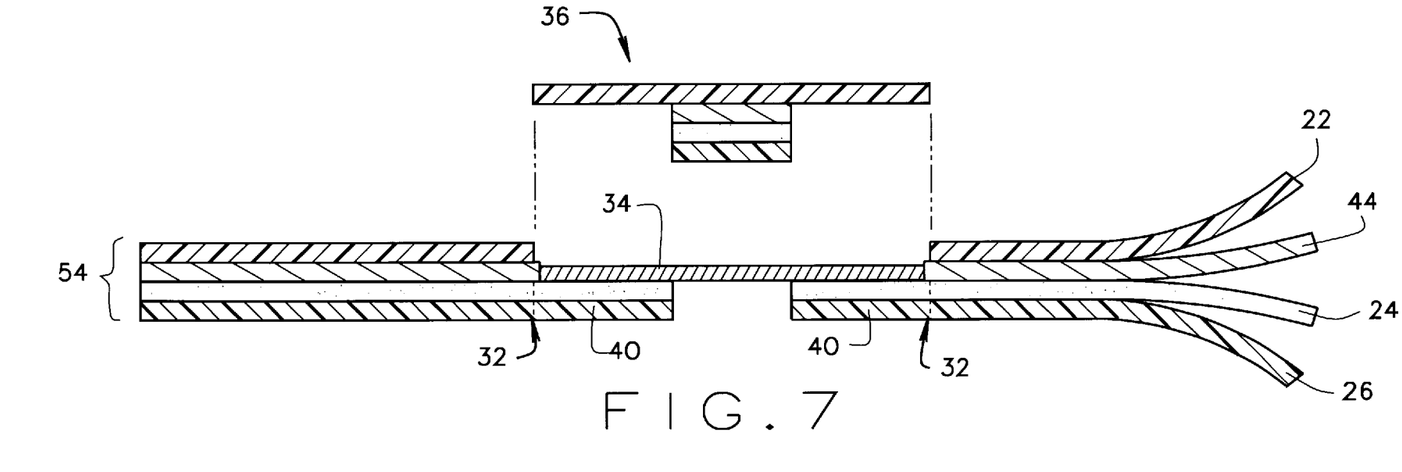
FIG. 7 is a cross section of another alternate embodiment of the inventive laminate showing additional lamina.

FIGS. 3 and 5 show the basic laminate in the "patch" form. In this form, the inventive laminate includes a patch 42 applied to the bottom surface 22b of the carrier lamina 22. The patch 42 comprises all lamina other than the carrier lamina 22, including the printable lamina 26 and the first adhesive lamina 24. However, if a release coating 44 on the carrier lamina is used in the laminate 20, as shown in FIG. 7, the release coating 44 may extend beyond the patch 42, if desired.

The full size and patch forms of the laminate address differing consumer needs. For example, the patch embodiment may be appropriate for mass mailings containing a small number of CDs in each mailing, probably only one. Thus, the area of the carrier lamina 22 may need to be large to accommodate the relevant marketing information. On the other hand, the area of the rest of the laminate, the patch 42, would preferably be as small as possible to minimize material expenses and the overall weight and thickness of the mailings. By using a patch 42 for the rest of the laminate, both goals are achieved efficiently and in a cost effective manner.

The full size laminate may be appropriate for use as individual CD labels suitable for sale in multi-packs of blank labels. In such a use, it may be desired to have the size of the entire laminate be as small as possible, in other words, just slightly larger than the CD itself. In such an arrangement, use of the patch 42 is not necessary and would not impart any significant material savings to the laminate.

The full size lamination may also be more appropriate for creating laminate sheets having multiple labels therein as in FIGS. 1 and 2. Such an arrangement would be more useful for the home office or individual user who does not label many CDs and for whom the added cost of the laminate material would be negligible. This is especially true in light of the added convenience of having multiple labels on a single sheet. As it would be inefficient (although possible) to have multiple patches 42 on the bottom 22b of the carrier lamina 22, the full size lamination may be more cost effective for this particular use.

Turning back to the elements of the laminate 20, the carrier lamina 22 can be seen to be any plastic, foil, paper or other substrate of suitable thickness and weight so long as it is able to support the laminate 20 through the die cutting, perforation and printing operations. In the preferred embodiment, however, the carrier lamina 22 is a business form composed of paper of 20 to 120 pound weight stock with a thickness of 2 to 10 mils. As shown in FIG. 7, the carrier lamina 22 may also have a release coating 44, usually silicone, applied to its bottom surface to aid in removing the waste slug 36 from the laminate 20.

The first adhesive lamina 24 has a greater affinity for the top surface 26a of the printable lamina 26 than the bottom surface 22b of the carrier lamina 22 or the bottom surface of the additional lamina described below. Because of this, as the waste slug 36 is removed, the first adhesive lamina 24 remains adhered to the printable lamina 26. Of course, the waste portion 24c of the first adhesive lamina between the carrier lamina waste portion 22c and the printable lamina waste portion 26c is removed with the waste slug 36 as it has no substantial connection to the laminate 20.

The adhesive lamina herein may be any suitable adhesive, including permanent, pressure sensitive, or removable.

The printable lamina 26 may be any paper, plastic or foil stock capable of receiving printing 33 on at least one of its top 26a or bottom 26b surfaces. As such, the printable lamina 26 could comprise printable stock or a thin foil ply or other print base lamina with a coating of print compatible material on the bottom surface 26b thereof. In the preferred embodiment, the printable lamina 26 is a polyester film of 1.5 mil thickness with ink-jet printable coating thereon. Also, the printable lamina 26 may be opaque or non-opaque, as desired. If non-opaque, printing on the top surface 26a of label 40 could be viewed through the printable lamina 26 after labeling the CD 34 which may be advantageous in some uses.

The first die cut 28 is substantially the same size and shape as the perimeter 34a of the CD 34 to be labeled and extends around the entire perimeter of the CD 34 to form a closed loop cut. The correspondence between the first die cut and the perimeter of the CD allows for the accurate self-alignment of the label 40 to the CD 34 when the waste slug 36 is removed and the CD 34 is placed within the well 38. And to allow for removal of the waste slug 36, the first die cut 28 extends through the carrier lamina 22—from the top surface 22a of the carrier lamina 22—and at least to the first adhesive lamina 24, but not through the printable lamina 26. As such, if there are additional lamina (i.e. 44, 46 or 48) between the first adhesive lamina 24 and the carrier lamina 22, the first die cut 28 will penetrate those lamina as well and waste portions of those lamina within the first die cut 28 will also become part of the waste slug 36.

The second die cut 30 is concentric with the first die cut 28 and also a closed loop. The second die cut 30 provides for a hole 50 in the label 40 which may correspond to the hole 34b in the CD 34. Note that the radius of the second die cut 30 can be any length ranging from equal to the radius of the hole 34b in a CD 34 to just slightly less than the length of the radius of the first die cut 28. Of course, it can also be any desired shape, including, but not limited to, circular. Also, it need not be the same shape as the first die cut 28. Thus, the hole 50 in the printable lamina 26 may be sized and shaped to correspond to the hole 34b in the CD, the hub 34c of the CD, or an area elsewhere on the surface of the CD, if desired. These variances in the size and shape of the second die cut 30 lend flexibility to the size and shape of the label 40 for the CD 34.

The perforations 32 in the laminate 20 are concentric with the first die cut 28 and create a frangible but secure connection between the label 40 and the rest of the printable lamina 26. Because of the perforations 32, the CD 34 can be placed in the well 38 and the CD 34 will remain secured to the laminate 20 and the carrier lamina 22, yet it will be easily removable therefrom. Although usually created in a separate operation, the perforations 32 can be formed simultaneously with the first die cut 28 by a slit-over-perforation method. This would place the perforations 32 directly below the first die cut 28 and substantially in register with the perimeter 34a of the CD 34.

In either patch or full size lamination form, the inventive lamination 20 includes alternative embodiments primarily related to the number and arrangement of additional lamina in the laminate. Two such embodiments are shown in FIGS. 6 and 7 although other combinations are possible and included within the scope of this disclosure and the appended claims.

Figure 6:
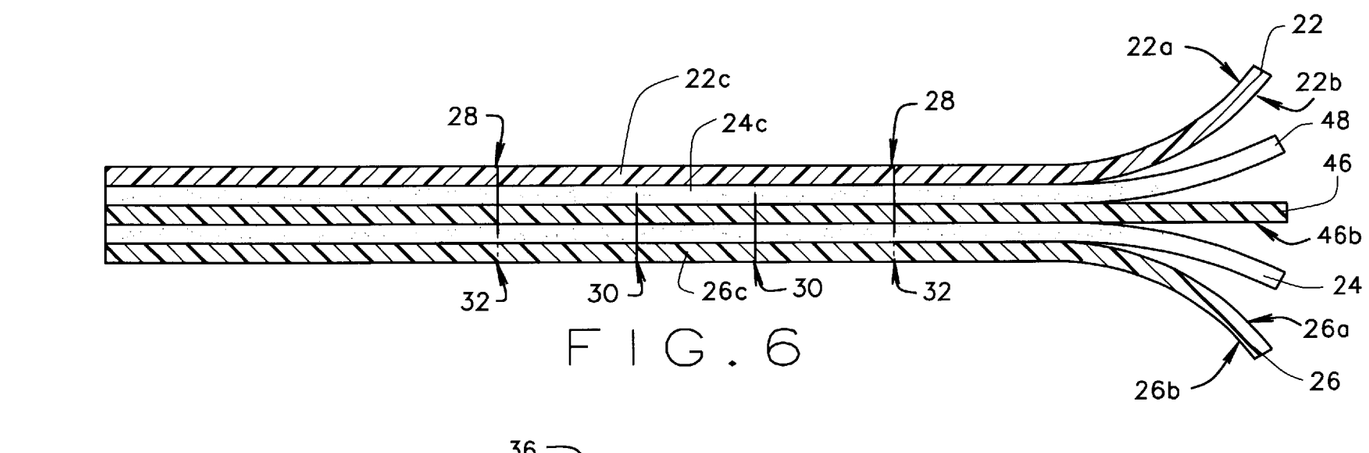
FIG. 6 is a cross section of an alternate embodiment of the inventive laminate showing additional lamina.

FIG. 6, a cross sectional view of the inventive laminate, shows additional lamina between the carrier lamina 22 and the printable lamina 26. In this embodiment, the additional laminas comprise a release liner 46 and a second adhesive lamina 48 securing the release lamina 46 to the bottom surface 22b of the carrier lamina 22. The bottom surface 46b of the release liner is secured to the rest of the laminate by the first adhesive lamina 24. As is well known in the art, a release liner is a thin stock having a release surface on at least one surface. As used in this embodiment of the laminate, the release liner 46 includes a release surface on only its bottom surface 46b. This release surface, usually a coating of silicone, allows for the easy separation of the release liner 46 from the first adhesive lamina 24 while leaving the first adhesive lamina 22 on the top surface 26a of the printable lamina 26. As will be understood, when the release liner 46 is used in the laminate 20, the release liner 46 and second adhesive lamina 48 are penetrated by the first die cut 28 and the portions of the release liner 46 and second adhesive lamina 48 within the first die cut 28 become part of the removable waste slug 36. Thus, the release surface of the release liner 46 aids in the removal of the waste slug 36 from the laminate 20. In this embodiment, the second adhesive lamina 48 may, but need not be a permanent adhesive, while the first adhesive lamina 24 may be, but need not be a pressure sensitive adhesive.

Also, the release liner 46 may be smaller than at least some of the rest of the laminate 20. Specifically, the release liner 46 may have an area smaller than that of both the first adhesive lamina 24 and said carrier lamina 22. In this way, the release liner 46 may be positioned completely within the perimeters of both the first adhesive 24 and the carrier lamina 22 so that the first die cut 28 penetrates the release liner 46 completely within the perimeter of the release liner 46. This modification of the preferred embodiment exhibits a stronger connection between the printable lamina 26 and carrier lamina 22 outside the perimeter of the release liner 46. As such, it may be used, for example, to prevent delamination in environments exhibiting excessive handling stress on the laminate.

FIG. 7 illustrates another embodiment of the invention with an additional lamina between the carrier 22 and printable lamina 26. In this embodiment, the additional lamina is a release coating 44 disposed on the bottom surface 22b of the carrier lamina 22. This release coating 44 may be any suitable material which lowers the affinity between the first adhesive lamina 24 and the carrier lamina 22 below the affinity between the first adhesive lamina 24 and the printable lamina 26. It is preferred, however, that this coating 44 be silicone. In this embodiment, the first adhesive lamina may, but need not be a pressure sensitive adhesive.

Figure 8:
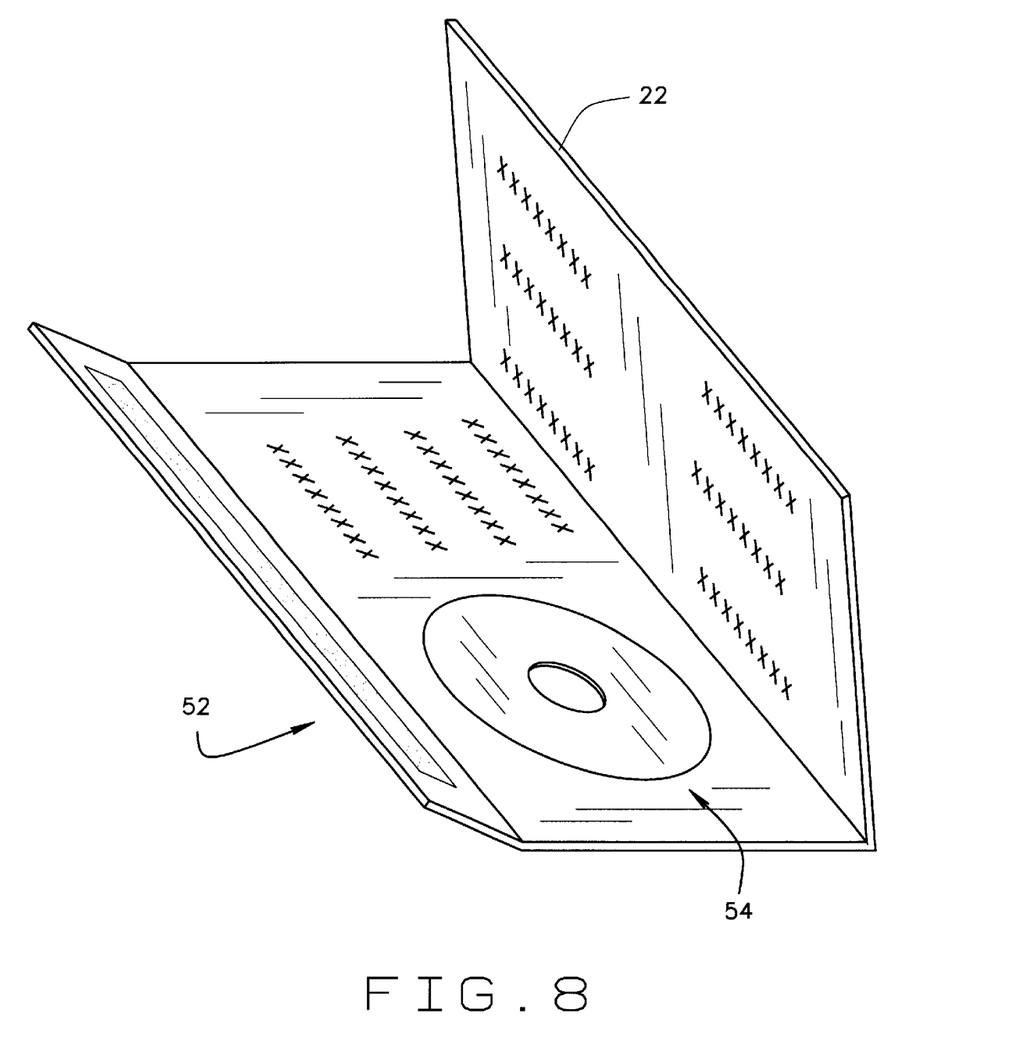
FIG. 8 is a perspective view of the inventive laminate and CD combination in mailer form.

Another form of the inventive laminate is also shown in FIGS. 7 and 8. This form is a combination 54 of the form with integrated label 40 and the CD 34 adhesively secured to the laminate 20. In this form, the laminate 20 can be used as an advertising brochure or even bulk mail advertisement. For example, as shown in FIG. 8, at least the carrier lamina 22 of the combination can sized and shaped such that it can be folded into a one piece, self-contained mailer 52 enclosing the CD 34 therein.

Turning now to the inventive methods, we can see that the steps of the methods disclosed herein may be performed in any suitable order or even simultaneously as appropriate.

Figure 9:
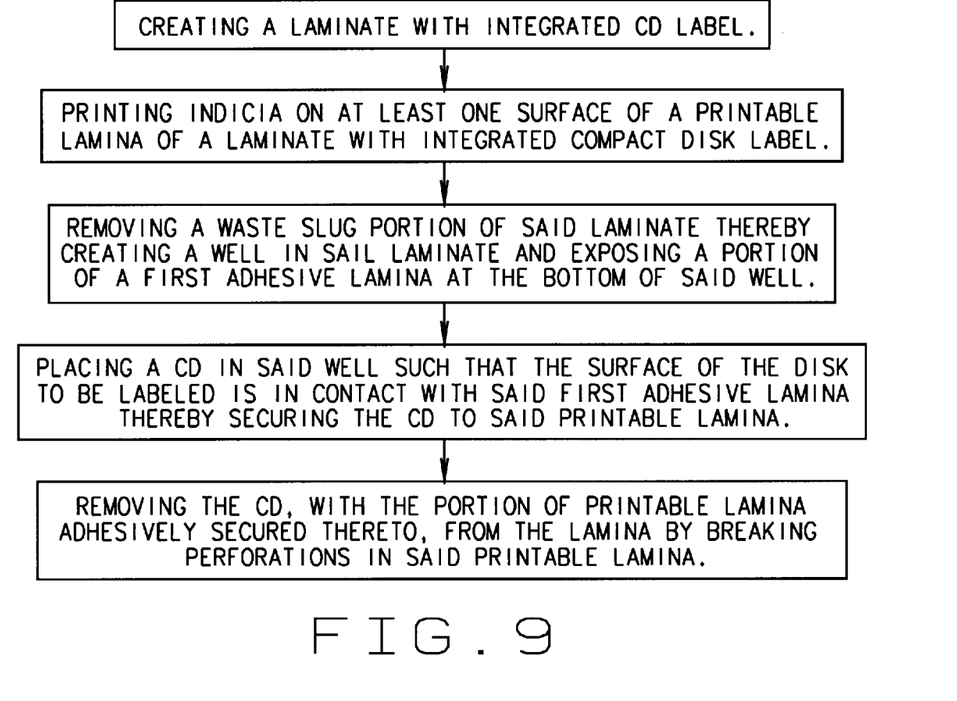
FIG. 9 is a flow chart showing a method of using the inventive laminate for home or home office use.

FIG. 9 shows a flow chart disclosing the elemental steps of the primary inventive method of labeling a CD. The method involves labeling a compact disk 34 using a laminate 20 with integrated compact disk label 40 and includes the steps of printing indicia 33 on at least one surface of a printable lamina 26 of the laminate 20; removing a removable waste slug portion 36 of the laminate 20 thereby creating a well 38 in the laminate 20 and exposing a portion of first adhesive lamina 24 at the bottom of the well 38; and placing a CD 34 in the well 38 in the laminate 20 such that the surface of the disk 34 to be labeled is placed in contact with said first adhesive lamina 24 thereby adhesively securing the CD 34 to the printable lamina 26 and labeling the CD.

At this stage, the CD 34 is labeled but is in combination 54 with the laminate 20. As such, an addition step in the use of the laminate 20 may include using the combination 54 as an advertisement or mailer 52. An additional step to this method may also be placing customized indicia 33 on other surfaces of the carrier and/or printable laminas. This may include additional advertisements as well as instruction on how to remove the labeled CD 34 from the combination 54. Such customization may also include customizing the data on the CD itself. In this way, an advertiser is given the opportunity to customize every aspect of its advertisements, including the carrier lamina 22, the CD label 40 and the CD 34 itself. Because the laminate 20 contains the carrier lamina 22 and label 40, synchronization of the data between these elements is inherent in the present invention. And synchronization of the data between the laminate 20 and the CD 34 is ensured by simply reading the customization data from the CD 34, transferring that information to the laminate 20 and then combining the CD 34 with the laminate 20 as previously described. It may also be possible to synchronize such data by encoding the CD 34 and printing the laminate 20 simultaneously. In either event, the unique properties of the laminate 20 ensure that such synchronization is not only possible, but efficient and cost effective.

Another additional step to this method may include removing the CD 34 with the label 40 adhesively secured to it by breaking the perforations 32 in said printable lamina 24 and "punching-out" said labeled CD 34 from the laminate 20. And, of course, the method of labeling the disk may also include the step of creating the laminate 20 used to perform the method.

Figure 10:
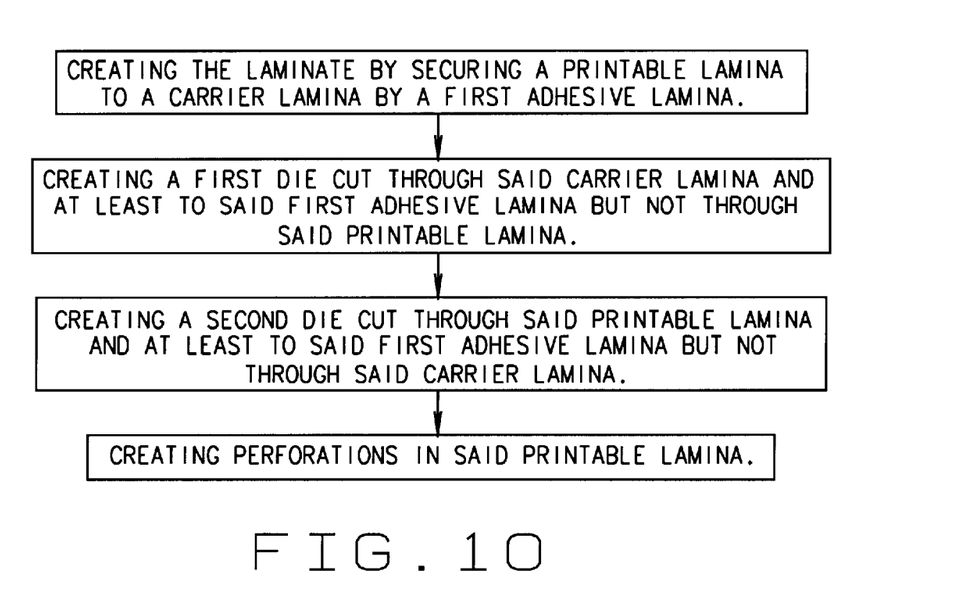
FIG. 10 is a flow chart showing a method of manufacturing the inventive laminate.

FIG. 10 shows the preferred method of manufacturing the inventive laminate 20, including the steps of securing a printable lamina 26 to a carrier lamina 22 by a first adhesive lamina 24; creating a first die cut 28 through said carrier lamina 22 and at least to said first adhesive lamina 24, but not through said printable lamina 26; creating a second die cut 30 extending through said printable lamina 26 and at least to said first adhesive lamina 24, but not through said carrier lamina 22; and creating perforations 32 through said printable lamina 26.

This method may also include the step of placing a release coating 44 on the bottom surface 22*b* of the carrier lamina 22. It may also include the step of securing a release liner 46 between said printable lamina 26 and said carrier lamina 22 by a second adhesive lamina 48.

The embodiments and specification described above are only illustrative and cannot be construed as limiting the scope of the present invention as claimed herein.

I claim:

1. A laminate with integrated compact disk label for a compact disk comprising:
   a carrier lamina having a perimeter and top and bottom surfaces;
   a first adhesive lamina having a perimeter and top and bottom surfaces;
   a printable lamina having a perimeter and top and bottom surfaces with at least one of the top or bottom surfaces of said printable lamina accepting printing thereon;
      wherein said first adhesive lamina secures said carrier lamina to said top surface of said printable lamina;
   a first looped die cut within the perimeter of said carrier lamina extending through said carrier lamina and at least to said first adhesive lamina but not through said printable lamina;
      wherein said first looped die cut has a radius at least equal to the outer radius of the compact disk, the compact disk having a predetermined outer radius and a hole;
   a second looped die cut concentric with said first looped die cut and having a shorter radius than the radius of said first die cut;
      wherein said second die cut extends through said printable lamina and at least to said first adhesive lamina but not through said carrier lamina;
      wherein said second die cut has a radius at least as long as the radius of a centrally located hole in the compact disk and shorter than the radius of said first die cut;
   a loop of perforations in said printable lamina concentric with said first die cut and having a radius equal to or shorter than the corresponding radius of said first die cut and longer than the corresponding radius of said second die cut;
      wherein a compact disk label is defined as the portions of said first adhesive lamina and said printable lamina within said perforations;
      wherein the portions the laminas within said first die cut and the portion of said printable lamina and first adhesive lamina within said second die cut define a removable waste slug portion of the laminate; and
   a centering well in the laminate defined by said first die cut and said first adhesive lamina top surface that centers the compact disk within said well upon replacement of said waste slug by the compact disk.

2. The laminate with integrated compact disk label of claim 1 further comprising:
   a second adhesive lamina; and
   a release liner having top and bottom surfaces;
      wherein the top surface of said release liner is secured to the bottom surface of said carrier lamina by said second adhesive lamina;
      wherein the bottom surface of said release liner has a release coating thereon;
      wherein the bottom surface of said release liner is secured to said printable lamina by said first adhesive lamina;
      wherein said first die cut extends through said release liner with the portion of said release liner within said first die cut becoming part of said waste slug.

3. The laminate with integrated compact disk label of claim 1 wherein said carrier lamina has a release coating on at least the bottom surface of the portion of the carrier lamina within said first die cut.

4. The laminate with integrated compact disk label of claim 1 wherein said first adhesive lamina is a removable adhesive having characteristics such that when at least a portion of said carrier lamina is peeled from said printable lamina, said first adhesive lamina will remain to the top surface of said printable lamina.

5. The laminate with integrated compact disk label of claim 1 wherein said waste slug is removed, creating a well in the laminate and exposing the portion of said first adhesive lamina within said first die cut at the bottom of the well.

6. The laminate with integrated compact disk label of claim 1 wherein the perimeters of the carrier lamina, first adhesive lamina, and printable lamina are of substantially the same size and shape and in substantial registry with each other.

7. The laminate with integrated compact disk label of claim 1 wherein the perimeters of at least said first adhesive lamina and said printable lamina are smaller than the perimeter of said carrier lamina, forming at least a patch on the bottom surface of said carrier lamina.

8. The laminate with integrated compact disk label of claim 1 wherein said first and second die cuts and said loop of perforations are circular in shape.

9. The laminate with integrated compact disk label of claim 1 wherein at least said first die cut has the shape of a polygon.

10. The laminate with integrated compact disk label of claim 1 wherein said printable lamina comprises a print base lamina having top and bottom surfaces with at least the bottom surface of said printable lamina having a printable coating disposed thereon.

11. The laminate with integrated compact disk label of claim 1 wherein said printable lamina comprises a polyester film with a matte texture on at least its bottom surface.

12. The laminate with integrated compact disk label of claim 1 wherein said printable lamina is a non-opaque film.

13. The laminate with integrated compact disk label of claim 1 wherein said printable lamina is clear paper.

14. The laminate with integrated compact disk label of claim 1 wherein said printable lamina is opaque paper with a matte finish on at least its bottom surface.

15. The laminate with integrated compact disk label of claim 1 wherein at least the top surface of the carrier lamina accepts printing.

16. The laminate with integrated compact disk label of claim 2 wherein at least the release liner has an area smaller than that of both said first adhesive lamina and said carrier lamina and said release liner is positioned within the perimeters of both said first adhesive lamina and said carrier lamina such that said first die cut is completely within the perimeter of said release liner.

17. The laminate with integrated compact disk of claim 2 wherein the release coating is silicone.

18. The laminate with integrated compact disk of claim 2 wherein said first adhesive lamina is a permanent adhesive having characteristics such that if said release liner or a portion thereof is peeled from said lamina, said first adhesive lamina will remain secured to the top surface of said printable lamina.

19. The laminate with integrated compact disk of claim 3 wherein the release coating is silicone.

20. The laminate with integrated compact disk of claim 3 wherein said first adhesive lamina is a permanent adhesive having characteristics such that if said carrier lamina or a portion thereof is peeled from said lamina, said first adhesive lamina will remain secured to the top surface of said printable lamina.

21. The laminate with integrated compact disk label of claim 9 wherein at least said first die cut has the shape of a compact disk card.

22. A laminate with integrated compact disk label and compact disk comprising:
   a compact disk having a predetermined outer radius and a centrally located hole;
   a carrier lamina having a perimeter and top and bottom surfaces;
   a first adhesive lamina having a perimeter;
   a printable lamina having a perimeter and top and bottom surfaces with at least one of the top or bottom surfaces of said printable lamina adapted to accept printing thereon;
      wherein said first adhesive lamina secures said carrier lamina to said top surface of said printable lamina;
   a first looped die cut within the perimeter of said carrier lamina extending through said carrier lamina and at least to said first adhesive lamina but not through said printable lamina;
      wherein said first looped die cut has a radius at least equal to the outer radius of said compact disk;
   a second looped die cut concentric with said first looped die cut and having a shorter radius than said first die cut;
      wherein said second die cut extends through said printable lamina and at least to said first adhesive lamina but not through said carrier lamina;
      wherein said second die cut has a radius at least as long as the radius of the hole in said compact disk and shorter than the radius of said first die cut;
   a loop of perforations in said printable lamina concentric with said first die cut and having a radius equal to or shorter than the corresponding radius of said first die cut and longer than the corresponding radius of said second die cut;
      wherein a compact disk label is defined as the portions of said first adhesive lamina and said printable lamina within said perforations;
      wherein the portion the laminas within said first die cut and the portion of said printable lamina and first adhesive lamina within said second die cut define a removable waste slug portion of the laminate;
   a well in the laminate created by removal of said waste slug from the laminate exposing the portion of said first adhesive lamina within said first die cut at the bottom of said well; and
      wherein said compact disk is disposed within said well and adhesively secured to said compact disk label by said first adhesive lamina.

23. The laminate with integrated compact disk label and compact disk of claim 22 further comprising:
   a second adhesive lamina; and
   a release liner having top and bottom surfaces;
      wherein the top surface of said release liner is secured to the bottom surface of said carrier lamina by said second adhesive lamina;
      wherein the bottom surface of said release liner has a release coating thereon;
      wherein the bottom surface of said release liner is secured to said printable lamina by said first adhesive lamina;
      wherein said first die cut extends through said release liner with the portion of said release liner within said first die cut becoming part of said waste slug.

24. The laminate with integrated compact disk label and compact disk of claim 22 wherein said carrier lamina has a release coating on at least the bottom surface of the portion of the carrier lamina within said first die cut.

25. The laminate with integrated compact disk label and compact disk of claim 22 wherein said first adhesive lamina is a removable adhesive having characteristics such that when at least a portion of said carrier lamina thereof is peeled from the printable lamina, said first adhesive lamina remains secured to the top surface of said printable lamina.

26. The laminate with integrated compact disk label and compact disk of claim 22 wherein the perimeters of said carrier lamina, first adhesive lamina, and printable lamina are of substantially the same size and shape and in substantial registry with each other.

27. The laminate with integrated compact disk label and compact disk of claim 22 wherein the perimeters of at least said first adhesive lamina and said printable lamina are smaller than the perimeter of said carrier lamina, forming at least a patch on the bottom surface of said carrier lamina.

28. The laminate with integrated compact disk label and compact disk of claim 22 wherein said first and second die cuts and said loop of perforations are circular in shape.

29. The laminate with integrated compact disk label and compact disk of claim 22 wherein at least said first die cut has the shape of a regular polygon.

30. The laminate with integrated compact disk label and compact disk of claim 22 wherein said printable lamina comprises a print base lamina having top and bottom surfaces with at least the bottom surface of said printable lamina having a printable topcoating disposed thereon.

31. The laminate with integrated compact disk label and compact disk of claim 22 wherein said printable lamina comprises a polyester film with a matte texture on at least its bottom surface.

32. The laminate with integrated compact disk label and compact disk of claim 22 wherein said printable lamina is a clear, transparent or translucent film.

33. The laminate with integrated compact disk label and compact disk of claim 22 wherein said printable lamina is clear paper.

34. The laminate with integrated compact disk label and compact disk of claim 22 wherein said printable lamina is opaque paper with a matte finish on at least its bottom surface.

35. The laminate with integrated compact disk label and compact disk of claim 22 wherein at least the top surface of the carrier lamina is adapted to accept printing.

36. The laminate with integrated compact disk label and compact disk of claim 23 wherein at least the release liner has an area smaller than that of both said first adhesive lamina and said carrier lamina and said release liner is positioned within the perimeters of both said first adhesive lamina and said carrier lamina such that said first die cut is completely within the perimeter of said release liner.

37. The laminate with integrated compact disk label and compact disk of claim 23 wherein the release coating is silicone.

38. The laminate with integrated compact disk label and compact disk of claim 24 wherein the release coating is silicone.

39. The laminate with integrated compact disk label and compact disk of claim 29 wherein at least said first die cut has the shape of a compact disk card.

* * * * *